(12) United States Patent
Obata et al.

(10) Patent No.: US 10,094,377 B2
(45) Date of Patent: Oct. 9, 2018

(54) OIL PUMP FOR VEHICLE AND VEHICLE WITH THE SAME

(71) Applicants: Tatsuo Obata, Toyota (JP); Hiromichi Kimura, Okazaki (JP); Takeshi Kuwahara, Nisshin (JP); Katsuhide Kitagawa, Seto (JP); Kunio Morisawa, Toyota (JP); Masamitsu Seno, Anjo (JP); Hirotaka Yata, Kariya (JP); Tomoo Atarashi, Kariya (JP)

(72) Inventors: Tatsuo Obata, Toyota (JP); Hiromichi Kimura, Okazaki (JP); Takeshi Kuwahara, Nisshin (JP); Katsuhide Kitagawa, Seto (JP); Kunio Morisawa, Toyota (JP); Masamitsu Seno, Anjo (JP); Hirotaka Yata, Kariya (JP); Tomoo Atarashi, Kariya (JP)

(73) Assignees: TOYOTA JIDOSHA KABUSHIKI KAISHA, Toyota-shi, Aichi-ken (JP); AISIN AW CO., LTD., Anjo-shi, Aichi-ken (JP)

( * ) Notice: Subject to any disclaimer, the term of this patent is extended or adjusted under 35 U.S.C. 154(b) by 176 days.

(21) Appl. No.: 14/362,203

(22) PCT Filed: Nov. 29, 2012

(86) PCT No.: PCT/IB2012/002534
§ 371 (c)(1),
(2) Date: Jun. 2, 2014

(87) PCT Pub. No.: WO2013/084039
PCT Pub. Date: Jun. 13, 2013

(65) Prior Publication Data
US 2014/0341757 A1    Nov. 20, 2014

(30) Foreign Application Priority Data

Dec. 5, 2011 (JP) ................................ 2011-266236

(51) Int. Cl.
*F04C 2/00* (2006.01)
*F04C 28/24* (2006.01)
(Continued)

(52) U.S. Cl.
CPC ................ *F04C 2/00* (2013.01); *B60K 6/405* (2013.01); *B60K 17/12* (2013.01); *F04C 14/24* (2013.01);
(Continued)

(58) Field of Classification Search
CPC ............... B60L 2260/28; B60L 3/0061; B60L 2260/86; B60L 13/0061; F01C 17/02;
(Continued)

(56) References Cited

U.S. PATENT DOCUMENTS 4,703,773 A * 11/1987 Hansen ................. F16K 11/022
137/597
4,729,721 A * 3/1988 Hansen .................. F23K 5/147
137/597
(Continued)

FOREIGN PATENT DOCUMENTS

CN      102235352 A    11/2011
DE      3638848 A1    5/1988
(Continued)

*Primary Examiner* — Devon Kramer
*Assistant Examiner* — Thomas Cash
(74) *Attorney, Agent, or Firm* — Sughrue Mion, PLLC (57) ABSTRACT

An oil pump for a vehicle includes a driven gear, a drive gear, a pump body, and a plate. The drive gear engages the driven gear. The pump body is secured to a rear cover of a transaxle case. The plate is interposed between the rear cover and the pump body. A pump chamber is formed between the rear cover and the pump body. The driven gear and the drive gear are housed in the pump chamber. The pump chamber is formed: between the plate and the pump body, or between the plate and the rear cover.

11 Claims, 4 Drawing Sheets

(51) Int. Cl.
*F04C 14/24* (2006.01)
*F04C 14/26* (2006.01)
*B60K 6/405* (2007.10)
*F16H 57/04* (2010.01)
*B60K 17/12* (2006.01)
*F04C 2/08* (2006.01)
*F04C 2/10* (2006.01)

(52) U.S. Cl.
CPC ......... *F04C 14/26* (2013.01); *F16H 57/0476* (2013.01); *F04C 2/086* (2013.01); *F04C 2/102* (2013.01); *F04C 2210/206* (2013.01); *F16H 57/0486* (2013.01)

(58) Field of Classification Search
CPC .. F01C 21/007; Y10S 903/906; Y10S 903/91; Y10S 903/916; Y10S 903/917; Y10S 903/951; H02K 7/116; H02K 2205/09; H02K 9/19; B60K 17/046; B60K 1/00; B60K 17/12; B60K 17/145; B60K 17/16; B60K 2001/001; B60K 6/365; B60K 6/40; B60K 6/48; B60K 6/52; B60K 6/547; F16H 2200/0021; F16H 57/0434; F16H 57/0476; F16H 57/0483; F04C 14/24; F04C 14/26; F04C 14/265; F01M 1/02; F01M 2001/0238; F01N 13/20

USPC ...................................................... 417/310
See application file for complete search history.

(56) References Cited

U.S. PATENT DOCUMENTS

| | | | | |
|---|---|---|---|---|
| 6,135,723 | A * | 10/2000 | Hatton | F04C 2/16 417/251 |
| 2010/0028172 | A1* | 2/2010 | Heuver | F04C 2/10 417/364 |
| 2011/0076165 | A1* | 3/2011 | Atarashi | B60K 6/26 417/321 |
| 2011/0194959 | A1* | 8/2011 | Oomura | F16H 61/0031 417/435 |
| 2011/0240430 | A1* | 10/2011 | Iwase | B60K 6/26 192/3.29 |
| 2011/0252906 | A1 | 10/2011 | Harashima et al. | |

FOREIGN PATENT DOCUMENTS

| | | |
|---|---|---|
| JP | 2002-070753 A | 3/2002 |
| JP | 2011-174583 A | 9/2011 |

\* cited by examiner

FIG. 4

OIL PUMP FOR VEHICLE AND VEHICLE WITH THE SAME

BACKGROUND OF THE INVENTION

1. Field of the Invention

This invention relates to an oil pump for a vehicle with a pump body that is secured to a rear cover of a transaxle case and a vehicle with the oil pump.

2. Description of Related Art

As disclosed in Japanese Patent Application Publication No. 2002-70753 (JP 2002-70753 A), the oil pump for a vehicle is disposed, for example, at an input side of a transaxle. The oil pump for a vehicle disclosed in JP 2002-70753 A includes a driven gear, a drive gear that engages the driven gear, and a pump chamber that houses the driven gear and the drive gear.

Some oil pumps of this kind are disposed on the opposite side of the input side of the transaxle, that is, on a rear cover side of the transaxle case. Such an oil pump for a vehicle includes, for example, a pump chamber formed between the rear cover and a pump body secured to the rear cover. Additionally, the oil pump includes the driven gear and the drive gear that engages the driven gear. The pump chamber houses the driven gear and the drive gear.

The above-described oil pump for a vehicle has a two-layer structure that includes the rear cover and the pump body. Between the rear cover of the transaxle case and the pump body, the pump chamber is formed. This limits flexibility in disposing an oil passage between the rear cover and the pump body. Accordingly, it may require providing an independent oil passage (that is, an additional oil passage) with the rear cover or the pump body. If the independent oil passage is provided with the rear cover or the pump body, for example, the rear cover or the pump body may increase in production cost.

SUMMARY OF THE INVENTION

The present invention provides an oil pump for a vehicle and a vehicle with the oil pump.

An oil pump for a vehicle according to a first aspect of the present invention includes a driven gear, a drive gear, a pump body, and a plate. The drive gear engages the driven gear. The pump body is secured to a rear cover of a transaxle case. The plate is interposed between the rear cover and the pump body. A pump chamber is formed between the rear cover and the pump body. The driven gear and the drive gear are housed in the pump chamber. The pump chamber is formed: between the plate and the pump body, or between the plate and the rear cover.

With the oil pump according to the first aspect of the present invention, the plate is interposed between the rear cover and the pump body. Accordingly, the pump chamber is formed between the plate and the pump body, or between the plate and the rear cover. In view of this, an oil passage may be formed between the plate and the rear cover, or between the plate and the pump body. This eliminates the need for forming an independent oil passage to the rear cover or the pump body.

Here, in the first aspect of the present invention, the plate may be made of metal with a higher strength than strengths of the rear cover and the pump body. The rear cover and the pump body may be made of light metal. Additionally, the plate may be made of a steel plate. This configuration reduces the weights of the pump body and the rear cover. The deformation of the pump chamber is restricted by the plate. The drive gear and the driven gear have side surfaces that are in sliding contact with the plate made of a steel plate, thus increasing a durability of the oil pump.

In the first aspect of the present invention, the rear cover may be supported by a mounting unit in a vehicle body. This configuration allows the plate to restrict deformation of the pump chamber due to a load input from the mounting unit.

In the first aspect of the present invention, the transaxle case may house an electric motor. Additionally, the pump body may rotatably support a rotor of the electric motor via a bearing. This configuration allows the plate to appropriately restrict a deformation of the pump chamber due to a load input from the bearing.

In the first aspect of the present invention, the oil pump may further include a control valve. The control valve includes a valve element, a valve chamber, and a spring housed in the valve chamber. The spring biases the valve element in a valve closing direction. The valve chamber is formed between the plate and the pump body, and houses the valve element. The plate may include a through hole that is closed by seating of the valve element. Additionally, when the control valve opens, an oil passage formed in the rear cover may be communicated with an oil passage formed in the pump body.

In the first aspect of the present invention, the plate may include a plurality of through holes. A plurality of control valves may be provided at one side of the plate. Additionally, the plurality of control valves may be disposed corresponding to the plurality of through holes, and have mutually different valve characteristics. In this configuration, the plurality of control valves is disposed parallel to one another at one side of the plate. This appropriately decreases a dimension of the plate of the pump body in a thickness direction, thus allowing downsizing of the pump body.

In the first aspect of the present invention, respective valve elements of the plurality of control valves may be made of a same component. Respective springs of the plurality of control valves may be made of a same component. Additionally, the plurality of through holes may have mutually different diameters. This configuration can reduce types of the plurality of valve elements and springs, thus ensuring the control valve at comparatively low production costs. This also reduces the possibility to mismount the valve elements and the springs when mounting the valve elements and the springs on the valve body.

In the first aspect of the present invention, the plate, the control valve, and the pump cover may constitute a unit of module. The unit of module may be mounted on the rear cover. This ensures quality assurance in a small unit (oil pump sub-assembly). This allows mechanically checking valve actuation in the sub-assembly, thus eliminating the need for checking actuation using hydraulic pressure and air pressure.

A vehicle according to a second aspect of the present invention includes a rear cover of a transaxle case and an oil pump. The oil pump includes a driven gear, a drive gear, a pump body, and a plate. The drive gear engages the driven gear. The pump body is secured to the rear cover. A pump chamber is formed between the rear cover and the pump body. The driven gear and the drive gear are housed in the pump chamber. The plate is interposed between the rear cover and the pump body. The pump chamber is formed between the plate and the pump body, or between the plate and the rear cover.

BRIEF DESCRIPTION OF THE DRAWINGS

The features, advantages, and technical and industrial significance of this invention will be described in the fol

DETAILED DESCRIPTION OF EMBODIMENTS

A description will be given of an embodiment of the present invention in detail below by referring to the accompanying drawings. In the following embodiment, the drawings are simplified or modified as needed for ease of understanding. A dimensional ratio, a shape, and a similar parameter of each part depicted in the drawings are not necessarily accurate.

Figure 1:
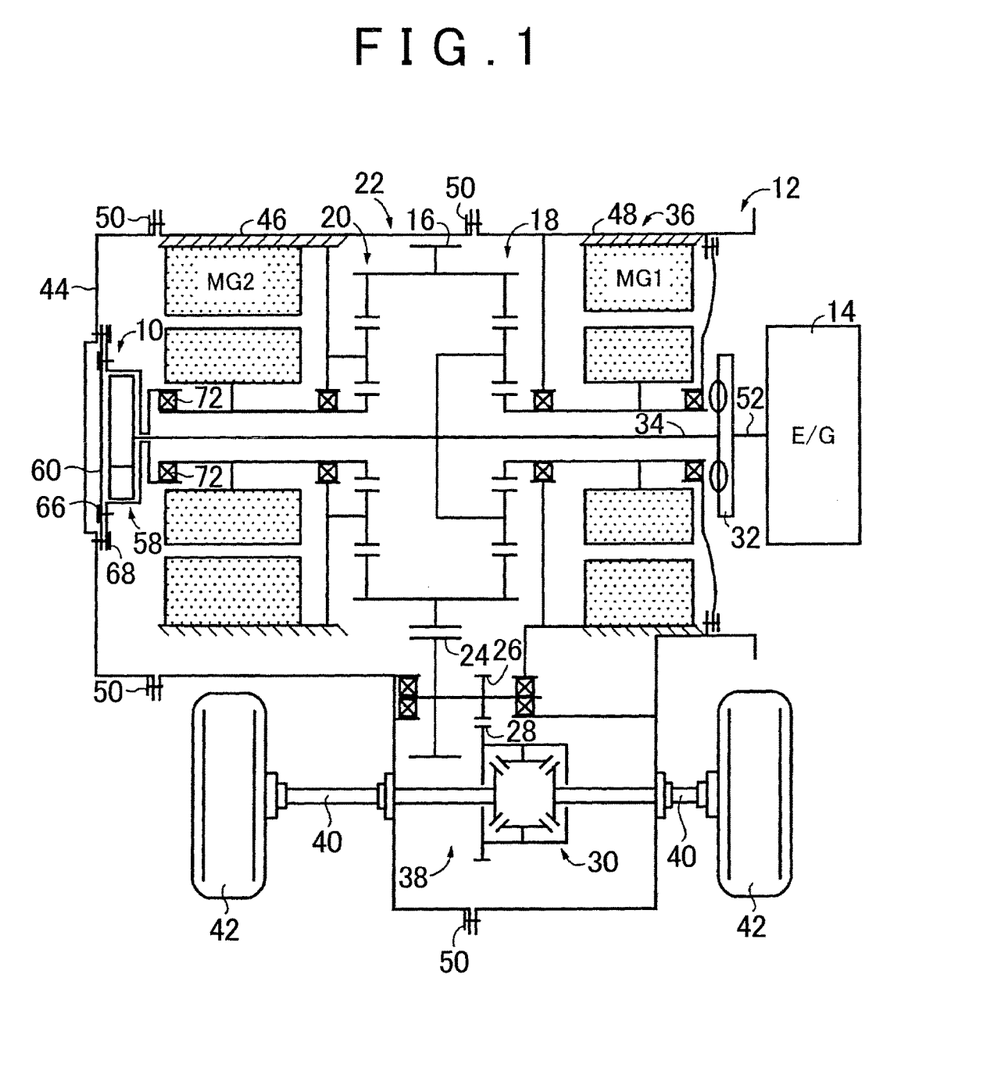
- FIG. 1 is a diagram illustrating a schematic configuration of a hybrid vehicle that includes an oil pump for vehicle according to an embodiment of the present invention.

FIG. 1 is a diagram illustrating a schematic configuration of a hybrid vehicle 12 (hereinafter referred to as a vehicle 12) including an oil pump 10 for a vehicle according to an embodiment of the present invention.

In FIG. 1, the vehicle 12 includes a transmission part 22. The transmission part 22 includes a power distribution mechanism 18 (a differential mechanism), a gear mechanism 20, and a second electric motor (an electric motor) MG2. The power distribution mechanism 18 distributes power, which is output from an engine 14 as a driving force source for running, to a first electric motor MG1 and an output gear 16. The output gear 16 functions as an output rotation member of the transmission part 22 (the power distribution mechanism 18). The gear mechanism 20 is coupled to the output gear 16. The second electric motor MG2 is coupled to the output gear 16 via the gear mechanism 20 so as to allow transmitting the power.

The above-described transmission part 22 is used for, for example, an FF (front-engine, front-wheel drive) vehicle where the engine 14 is transversely mounted in the vehicle 12. A power transmission unit 38 includes a pair of counter gears (14, 26), a pair of final gears (26, 28), a differential gear unit (a final reduction gear) 30, a damper 32, an input shaft 34, and a similar component. The pair of counter gears includes the output gear 16 and a counter driven gear 24. The pair of final gears includes a final drive gear 26 and a final driven gear 28. The damper 32 is operatively coupled to the engine 14. The input shaft 34 is operatively coupled to the damper 32. The power transmission unit 38 serves as a transaxle (T/A) in a transaxle case 36. The transaxle case 36 is mounted on a vehicle body frame 80 (a vehicle body) illustrated in FIG. 4, which is described below, and serves as a non-rotating member. The power transmission unit 38 thus configured transmits a power from the engine 14 and a power from a second electric motor MG2 to the output gear 16. Here, the power from the engine 14 is input to the power transmission unit 38 through the damper 32 and the input shaft 34. Subsequently, the power from the engine 14 and the power from the second electric motor MG2 are transmitted from the output gear 16 to a pair of driving wheels 42 sequentially via the pair of counter gears and the pair of final gears, a differential gear unit 30, a pair of wheel axes 40, and a similar component.

As illustrated in FIG. 1, the transaxle case 36 includes the second electric motor MG2, the power distribution mechanism 18, a transaxle rear cover 44 (hereinafter referred to as a rear cover 44), a cylindrical first case 46, and a cylindrical second case 48. The rear cover 44 and the first case 46 house the gear mechanism 20. The second case 48 is coupled to a part at the side of the engine 14 of the first case 46. The second case 48 houses the first electric motor MG1 and a differential gear unit 30. As illustrated in FIG. 1, the transaxle case 36 includes the rear cover 44, the first case 46, and the second case 48 that are integrally secured using a fastening member 50 such as a bolt.

As illustrated in FIG. 1, the input shaft 34 includes one end part that is coupled to a crankshaft 52 of the engine 14 via the damper 32. This allows the engine 14 to rotate and drive the input shaft 34. The oil pump 10 is coupled to the other end part of the input shaft 34. The engine 14 rotates and drives the input shaft 34, thus driving the oil pump 10.

Figure 2:
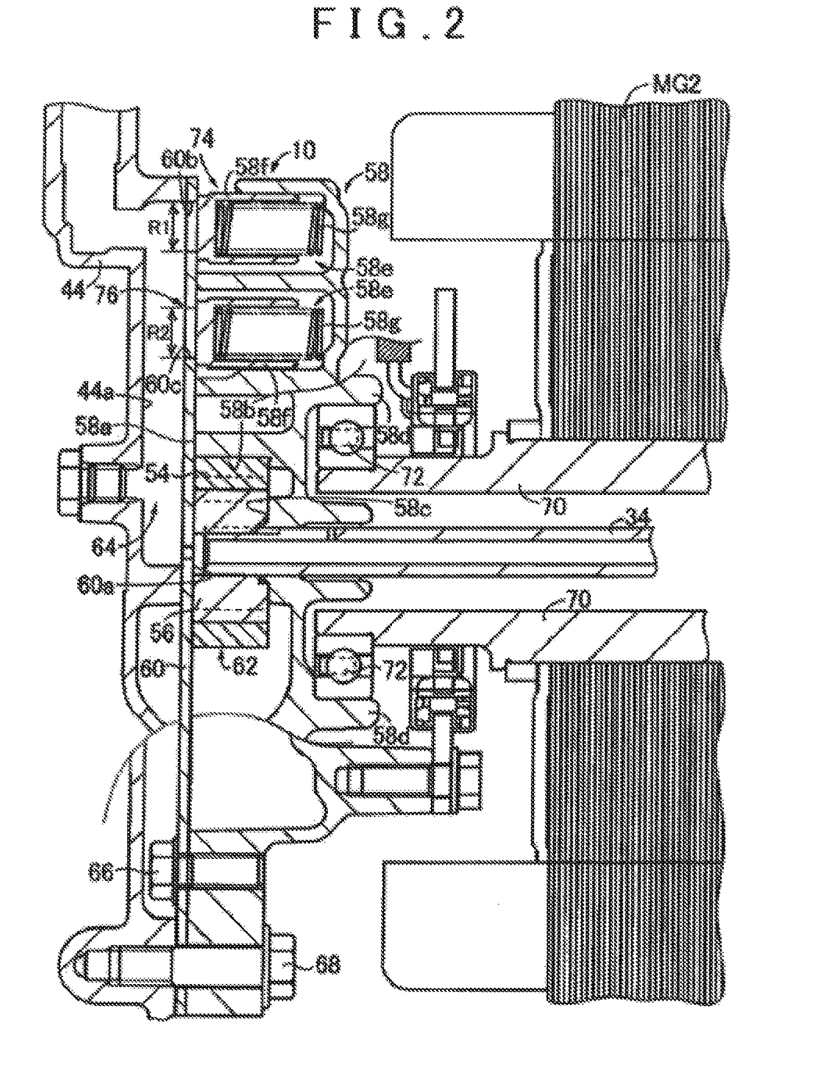
FIG. 2 is a cross-sectional view illustrating a configuration of the oil pump for vehicle in FIG. 1.
Figure 3:
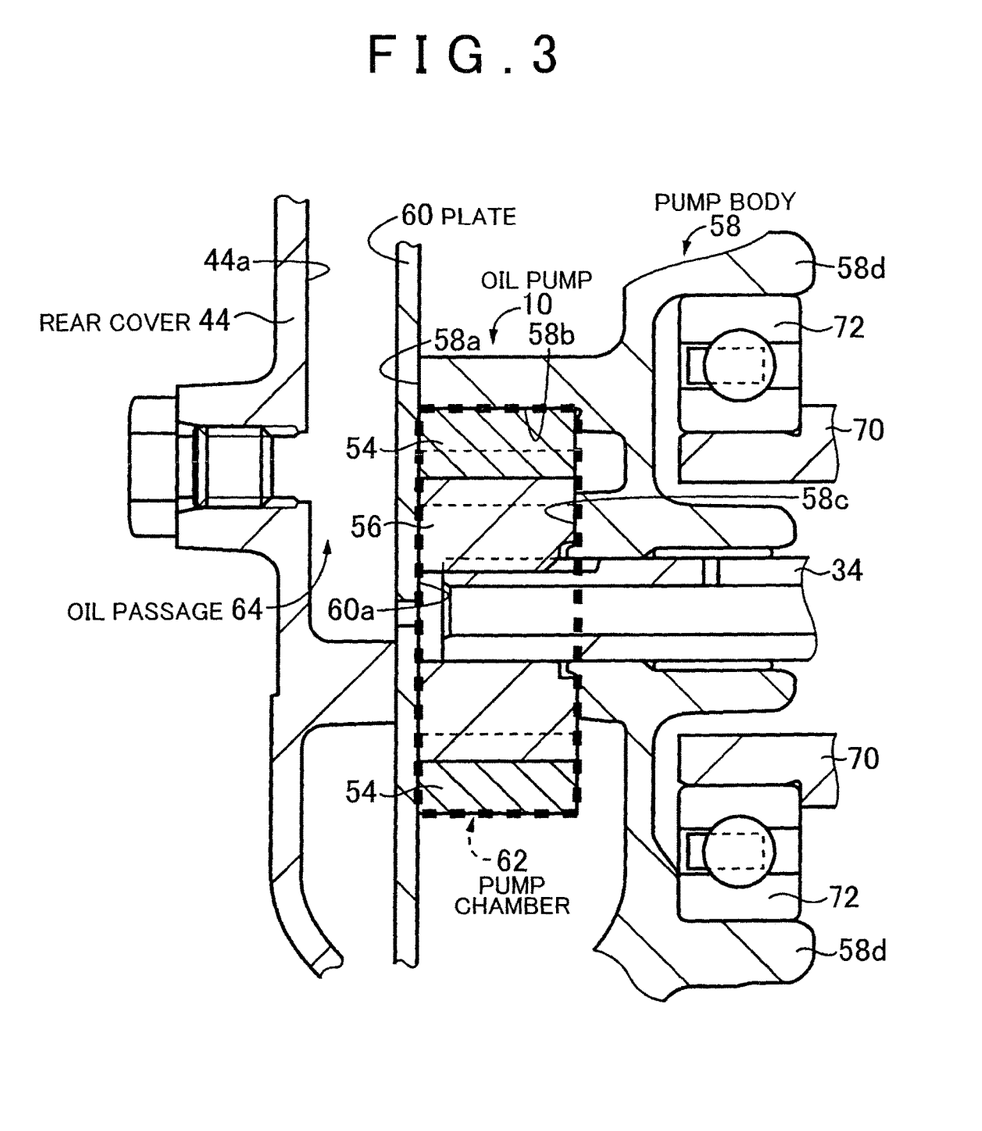
FIG. 3 is an enlarged view of FIG. 2 illustrating a pump chamber in the oil pump for vehicle in FIG. 2.

As illustrated in FIG. 2 and FIG. 3, the oil pump 10 includes a circular driven gear 54 and a drive gear 56. The drive gear 56 includes external teeth that engage the internal teeth of the driven gear 54. That is, the oil pump 10 is an internal gear pump where the driven gear 54 engages the drive gear 56. Here, the other end part of the input shaft 34 is coupled to the drive gear 56 such that the input shaft 34 is unrotatable with respect to the drive gear 56.

As illustrated in FIG. 2 and FIG. 3, the oil pump 10 includes a pump body 58, a flat plate 60, and a pump chamber 62. The pump body 58 is secured to the rear cover 44. The plate 60 is interposed between the pump body 58 and the rear cover 44. The pump chamber 62 is formed between the plate 60 and the pump body 58. The pump chamber 62 has a columnar space surrounded by an inner peripheral surface 58b, a first inner wall surface 58c, and a second inner wall surface 60a. That is, the columnar space is a space surrounded by a dashed line illustrated in FIG. 3. The inner peripheral surface 58b is formed by depressing an end surface 58a of the pump body 58 at the plate 60 side in a columnar shape. The first inner wall surface 58c is positioned at one end part of the inner peripheral surface 58b in the shaft center direction of the input shaft 34. The second inner wall surface 60a is positioned at the other end part of the inner peripheral surface 58b in the shaft center direction of the input shaft 34. The pump chamber 62 rotatably houses the driven gear 54 and the drive gear 56.

As illustrated in FIG. 2 and FIG. 3, the oil pump 10 includes an oil passage 64 constituted by a groove 44a of the rear cover 44 and the plate 60. Hydraulic oil that is discharged from the oil pump 10 is supplied to the oil passage 64. Then, the hydraulic oil is supplied from the oil passage 64 to a hydraulic pressure control circuit.

As illustrated in FIG. 2, the plate 60 is secured to the pump body 58 and the rear cover 44 using a first fastening bolt 66 and a second fastening bolt 68 such as a bolt. As described above, the plate 60 is interposed between the pump body 58 and the rear cover 44. The rear cover 44 and the pump body 58 are made of light metal, for example, aluminum alloy. The plate 60 is made of a metal plate with a higher strength than strengths of the rear cover 44 and the pump body 58, for example, made of a steel plate.

As illustrated in FIG. 2 and FIG. 3, the pump body 58 includes a cylindrical protrusion 58d. The protrusion 58d protrudes in the axis direction from the end part of the pump body 58 at the side of the second electric motor MG2 toward the second electric motor MG2. A bearing 72 is interposed between the protrusion 58d and a rotor 70 in the second electric motor MG2. This allows the protrusion 58d on the pump body 58 to rotatably support the rotor 70 in the second electric motor MG2 via the bearing 72.

As illustrated in FIG. 2, the pump body 58 in the oil pump 10 includes a pair of control valves 74 and 76 inside. In this embodiment, the oil pump may include a plurality of control valves at a surrounding of the input shaft 34. The control valves 74 and 76 each include a valve chamber 58e, a valve element 58f, and a spring 58g. The valve chamber 58e is formed between the pump body 58 and the plate 60. The valve element 58f is housed in the valve chamber 58e such that the valve element 58f is movable in the thickness direction of the plate 60. The spring 58g is housed in the valve chamber 58e, and biases the valve elements 58f in the valve closing direction. The pair of control valves 74 and 76 serves as, for example, a relief valve. The pair of control valves 74 and 76 drain hydraulic oil in the oil passage 64, which is formed in the rear cover 44, to a return oil passage (not shown) formed in the pump body 58. The pair of control valves 74 and 76 include the valve elements 58f and the springs 58g that are each the same component. That is, the respective valve elements 58f of the plurality of control valves 74 and 76 are made of a same component, and the respective springs 58g of the plurality of control valves 74 and 76 are made of a same component.

As illustrated in FIG. 2, the plate 60 includes a pair of through holes 60b and 60c. The through holes 60b and 60c have a circular shape and communicate the valve chambers 58e in the pair of control valves 74 and 76 with a space in the oil passage 64. It is configured that the valve elements 58f in the pair of control valves 74 and 76 are seated on the plate 60 by biasing force of the springs 58g so as to close the pair of respective through holes 60b and 60c. As illustrated in FIG. 2, the pair of control valves 74 and 76 is disposed at the side of the pump body 58 on the plate 60. The pair of control valves 74 and 76 corresponds to the pair of respective through holes 60b and 60c. That is, the pair of control valves 74 and 76 is disposed in parallel in the pump body 58.

As illustrated in FIG. 2, the through holes 60b and 60c, which are formed on the plate 60, have mutually different diameters R1 and R2. The pair of control valves 74 and 76 has a valve characteristic where the valve elements 58f of the control valves 74 and 76 open when hydraulic pressure of the hydraulic oil in the oil passage 64 is a valve opening set pressure. As described above, the pair of the control valves 74 and 76 has the valve elements 58f and the springs 58g that employ the same component. Accordingly, the valve characteristic varies depending on the size of the diameters R1 and R2 of the through holes 60b and 60c on the plate 60. In view of this, the control valves 74 and 76 have mutually different valve opening characteristics.

As illustrated in FIG. 2, the plate 60, the pair of control valves 74 and 76, and the pump body 58 is preliminarily assembled using the first fastening bolt 66 and constitute a module as one unit. Accordingly, the plate 60, the pair of control valves 74 and 76, and the pump body 58 is mounted as a module on the rear cover 44 using the second fastening bolt 68. That is, the module constituted of the plate 60, the pair of control valves 74 and 76, and the pump body 58 is mounted on the rear cover 44.

Figure 4:
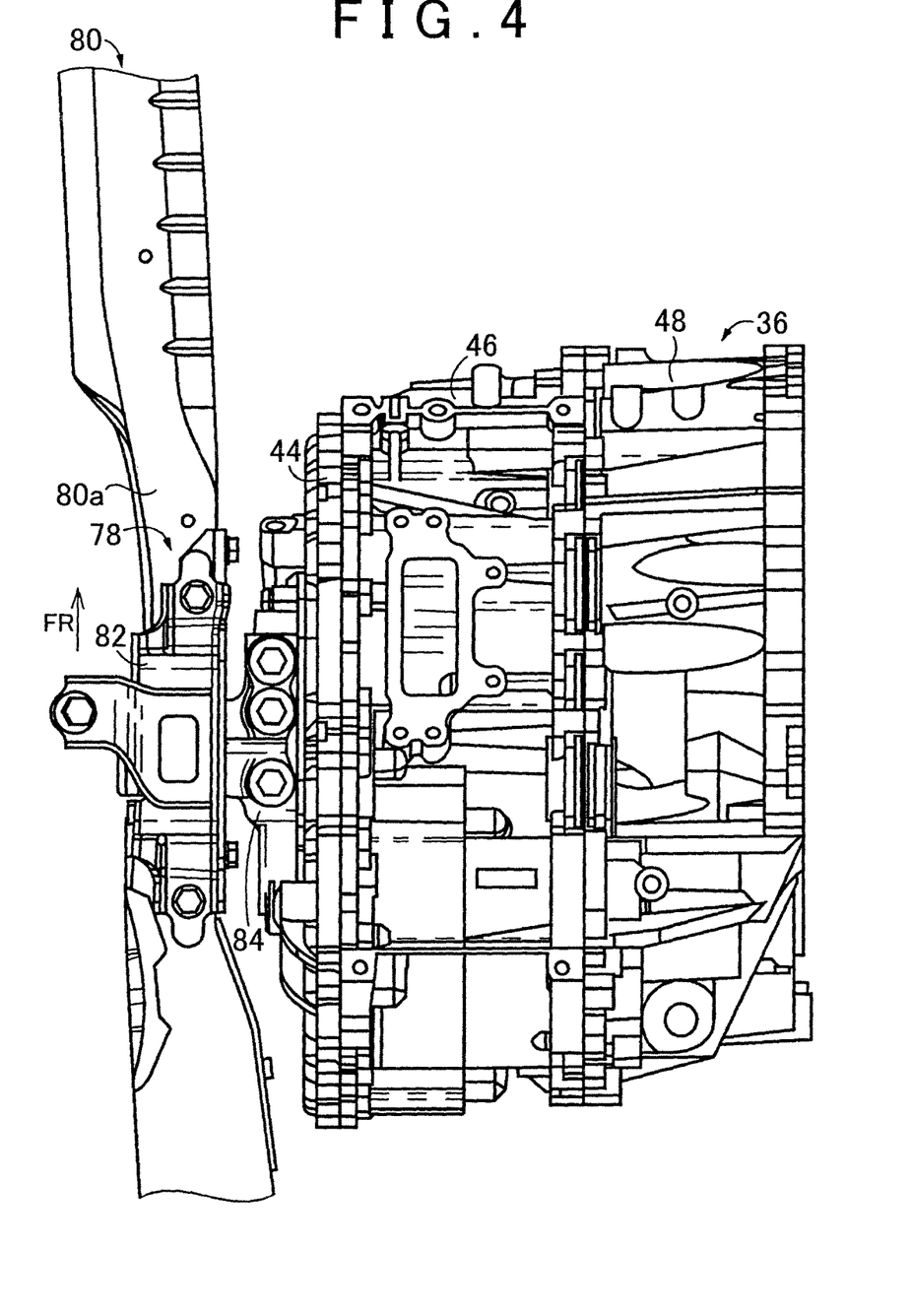
FIG. 4 is a diagram illustrating a mounting unit mounted on the rear cover in FIG. 2.

FIG. 4 is a diagram illustrating a mounting unit 78 mounted on the rear cover 44 of the transaxle case 36. According to FIG. 4, the rear cover 44 is supported by the mounting unit 78 provided with a side member 80a. The side member 80a is disposed at the left side of a vehicle body frame 80 in a vehicle front direction illustrated in FIG. 4. In FIG. 4, an arrow FR indicates the vehicle front direction.

As illustrated in FIG. 4, the mounting unit 78 includes a vehicle body frame side member 82, a transaxle side member 84, and a cylindrical mount bush (not shown). The vehicle body frame side member 82 is integrally fastened to the side member 80a using a plurality of bolts. The transaxle side member 84 is fastened to the rear cover 44 using a plurality of bolts. The mount bush is made of an elastic member such as a rubber that is interposed between the transaxle side member 84 and the vehicle body frame side member 82. The mount bush absorbs or damps vibration that occurs in the power transmission unit 38 or the transaxle.

According to the oil pump 10 in this embodiment, the plate 60 is interposed between the rear cover 44 and the pump body 58. The pump chamber 62 is formed between the plate 60 and the pump body 58. This allows forming the oil passage 64 between the plate 60 and the rear cover 44. In this configuration, it is not necessary to form an independent oil passage to the rear cover 44 or the pump body 58.

According to the oil pump 10 in this embodiment, the rear cover 44 and the pump body 58 are made of aluminum alloy. The plate 60 is made of a steel plate with a higher strength than strengths of the rear cover 44 and the pump body 58. While reducing the weights of the pump body 58 and the rear cover 44, the deformation of the pump chamber 62 is restricted by the plate 60 with the high strength. The drive gear 56 and the driven gear 54 have side surfaces that are in sliding contact with the plate 60 made of a steel plate, thus increasing durability of the oil pump 10.

According to the oil pump 10 in this embodiment, the rear cover 44 is supported by the mounting unit 78 disposed in the side member 80a of the vehicle body frame 80. Thus, a deformation of the pump chamber 62 caused by a load input from the mounting unit 78, that is, a deformation of the rear cover 44 is restricted by the plate 60 with the high strength. Especially, this effect is significant because the plate 60 is made of a steel plate.

According to the oil pump 10 in this embodiment, the transaxle case 36 houses the second electric motor MG2 inside. The pump body 58 rotatably supports the rotor 70 in the second electric motor MG2 via the bearing 72. Thus, a deformation of the pump chamber 62 caused by a load input from the bearing 72, that is, a deformation of the pump body 58 is appropriately restricted by the plate 60 with the high strength. Especially, this effect is significant because the plate 60 is made of a steel plate.

According to this embodiment, the oil pump 10 includes the valve elements 58f and the control valves 74 and 76. The valve elements 58f are housed in the valve chambers 58e formed between the plate 60 and the pump body 58. The control valves 74 and 76 include the springs 58g housed in the valve chambers 58e and bias the valve elements 58f in the valve closing direction. The plate 60 has the through holes 60b and 60c, which are closed by seating of the valve elements 58f in the control valves 74 and 76. The control valves 74 and 76 drain hydraulic oil in the oil passage 64, which is formed in the rear cover 44, to the oil passage, which is formed in the pump body 58. That is, in the case where the control valves 74 and 76 open, the oil passage 64 formed in the rear cover 44 is communicated with the oil passage formed in the pump body 58. In this configuration, the valve elements 58f of the control valves 74 and 76 seal the through holes 60b and 60c at valve sealing surfaces of the plate 60. The valve sealing surfaces are made of a steel plate. This appropriately prevents abrasion of the peripheral parts of the through holes 60b and 60c on the plate 60.

According to the oil pump 10 in this embodiment, the plate 60 has the pair of through holes 60b and 60c. The pair of control valves 74 and 76 is disposed on a surface at one side of the plate 60 corresponding to the pair of respective through holes 60b and 60c. The control valves 74 and 76 have mutually different valve characteristics. In view of this, control valves 74 and 76 are disposed parallel to one another at one side surface of the plate 60. This decreases a dimension of the plate 60 in the pump body 58 in a thickness direction, thus allowing downsizing of the pump body 58. Note that, in this embodiment, the plate 60 may include a plurality of the through holes corresponding to the respective the plurality of the control valves.

According to the oil pump 10 in this embodiment, the valve elements 58f of the pair of control valves 74 and 76 are each made of a same component, and furthermore the springs 58g of the pair of control valves 74 and 76 are each made of a same component. The through holes 60b and 60c, which are closed by the valve elements 58f of the pair of control valves 74 and 76, have mutually different diameters R1 and R2. This reduces types of the valve elements 58f and springs 58g in the pair of control valves 74 and 76, thus ensuring the pair of control valves 74 and 76 at comparatively low production cost. This also prevents mismounting of the valve elements 58f and the springs 58g when mounting the valve elements 58f and the springs 58g on the pump body 58.

According to the oil pump 10 in this embodiment, the plate 60, the pair of control valves 74 and 76, and the pump body 58 constitute a module assembled as one unit. Accordingly, the plate 60, the pair of control valves 74 and 76, and the pump body 58 are mounted as a module on the rear cover 44. This ensures quality assurance in a small unit (oil pump sub-assembly). This allows mechanically checking valve actuation in the sub-assembly. In this configuration, it is not necessary to check actuation using hydraulic pressure and air pressure.

While one embodiment according to the present invention is described above based on the drawings, the present invention is also applied to other aspects.

For example, in the oil pump 10 in this embodiment, the pump chamber 62 is formed between the plate 60 and the pump body 58, and the oil passage 64 is formed between the plate 60 and the rear cover 44. In contrast, for example, the pump chamber 62 may be formed between the plate 60 and the rear cover 44, and the oil passage 64 may be formed between the plate 60 and the pump body 58.

The oil pump 10 according to the embodiment is an internal gear pump where the circular driven gear 54 engages the drive gear 56. The drive gear 56 has the external teeth that engage the internal teeth of the driven gear 54. In contrast, for example, the oil pump may be an external gear pump where external teeth of a drive gear engage external teeth of a driven gear.

While in the oil pump 10 of this embodiment, the rear cover 44 and the pump body 58 are made of aluminum alloy, a light metal other than aluminum alloy may be employed. Additionally, while the plate 60 is made of a steel plate, any metal plate may be used insofar as the metal plate has a higher strength than the strengths of the rear cover 44 and the pump body 58.

Obviously, numerous modifications and variations of the present invention are possible in light of the above teachings. It is to be understood that the present invention may be embodied with various other changes, modifications and improvements, which may occur to those skilled in the art.

The invention claimed is:
1. An oil pump for a vehicle, comprising:
a driven gear;
a drive gear that engages the driven gear;
a pump body secured to a rear cover of a transaxle case;
a plate interposed between the rear cover and the pump body, wherein the pump body is disposed at a first side of the plate, and the rear cover is disposed at a second side of the plate that is opposite to the first side of the plate;
a pump chamber formed between the plate and the pump body, wherein the driven gear and the drive gear are housed in the pump chamber, and
an oil passage between the rear cover and the pump second side of the plate; and
a relief valve comprising a valve element, a valve chamber, and a spring,
wherein:
the valve chamber houses the valve element and is formed between the first side of the plate and the pump body;
the spring is housed in the valve chamber and biases the valve element in a valve closing direction;
the plate includes a through hole extending from the valve chamber to the oil passage, the through hole being closed by seating of the valve element on the first side of the plate, and the valve element covering the through hole; and
the oil passage communicates with an oil passage formed in the pump body when the relief valve opens.

2. The oil pump according to claim 1, wherein the plate is made of metal, the metal having a higher strength than strengths of the rear cover and the pump body.

3. The oil pump according to claim 2, wherein:
the rear cover and the pump body are made of light metal; and
the plate is made of a steel plate.

4. The oil pump according to claim 1, wherein the rear cover is supported by a mounting unit, the mounting unit being disposed in a vehicle body.

5. The oil pump according to claim 1, wherein:
the transaxle case houses an electric motor; and
the pump body rotatably supports a rotor of the electric motor via a bearing.

6. The oil pump according to claim 1, wherein:
the plate includes a plurality of the through holes;
a plurality of the relief valves is provided at the first side of the plate; and
the relief valves are disposed corresponding to the plurality of the through holes and have mutually different valve characteristics.

7. The oil pump according to claim 6, wherein:
respective valve elements of the plurality of the relief valves are made of a same component;
respective springs of the plurality of the relief valves are made of a same component; and
the through holes have mutually different diameters.

8. The oil pump according to claim 1, wherein:
the plate, the relief valve, and the pump body constitute a module as a unit; and
the module is mounted on the rear cover.

9. A vehicle comprising:
a rear cover of a transaxle case;
an oil pump comprising a driven gear, a drive gear, a pump body, and a plate, wherein the plate has a first side and a second side that is opposite to the first side;
an oil passage between the rear cover and the second side of the plate; and
a relief valve comprising a valve element, a valve chamber, and a spring,
wherein:
the valve chamber houses the valve element and is formed between the first side of the plate and the pump body;

the spring is housed in the valve chamber and biases the valve element in a valve closing direction;

the plate includes a through hole extending from the valve chamber to the oil passage, the through hole being closed by seating of the valve element on the first side of the plate and the valve element covering the through hole;

the drive gear engages the driven gear;

the pump body is secured to the rear cover;

a pump chamber is formed between the plate and the pump body;

the driven gear and the drive gear are housed in the pump chamber; and the plate is interposed between the rear cover and the pump body.

10. The vehicle according to claim 9 further comprising a mounting unit that is disposed in a vehicle body of the vehicle and supports the rear cover.

11. The vehicle according to claim 4 further comprising:

an electric motor housed in the transaxle case; and a bearing, wherein the pump body rotatably supports a rotor of the electric motor via the bearing.

\* \* \* \* \*